(12) United States Patent  
Williams (10) Patent No.: US 7,355,121 B2  
(45) Date of Patent: Apr. 8, 2008

(54) FRICTION REDUCING ELECTRICAL CABLE RING

(76) Inventor: Roger C. Williams, 2024 Pueblo Ct., Santa Rosa, CA (US) 95409

( * ) Notice: Subject to any disclaimer, the term of this patent is extended or adjusted under 35 U.S.C. 154(b) by 0 days.

(21) Appl. No.: 11/336,508

(22) Filed: Jan. 19, 2006

(65) Prior Publication Data
US 2007/0167067 A1 Jul. 19, 2007

(51) Int. Cl.
*H02G 3/04* (2006.01)
(52) U.S. Cl. ............... 174/72 A; 174/932; 439/470
(58) Field of Classification Search ........... 439/190, 439/470, 162; 174/72 A, 72 C, 135, 136, 174/932
See application file for complete search history.

(56) References Cited

U.S. PATENT DOCUMENTS 5,796,045 A * 8/1998 Lancien et al. ............ 174/109

6,603,076 B2 * 8/2003 Doshita et al. ........... 174/72 A

* cited by examiner

*Primary Examiner*—Khiem Nguyen
(74) *Attorney, Agent, or Firm*—Risto A. Rinne, Jr.

(57) ABSTRACT

An apparatus for reducing the friction of an electrical cable ring and a ground surface has a one-piece continuous shell with a gap at one end. The apparatus is grasped at its ends at the gap and is pulled apart to increase the size of the gap sufficient to allow it to fit over a longitudinal length of an electrical cable at any preferred location of the electrical cable. The apparatus includes a length of double sided self-adhesive tape extending along its inside length (ID) that is used to adhere it to an exterior surface of the electrical cable. A plurality of the cable rings are used. Modified versions of the cable ring are disclosed that include a tie-wrap in a recess and two identical halves that mate together and an embodiment that includes a smaller inside diameter than the outside diameter of the electrical cable. A method of making the apparatus and a method of welding a pair of ends together are disclosed.

23 Claims, 4 Drawing Sheets

FRICTION REDUCING ELECTRICAL CABLE RING

BACKGROUND OF THE INVENTION

1. Field of the Invention

The present invention, in general relates to electrical cables and, more particularly, to a device for reducing friction.

On the tarmac at airports, heavy electrical cables that supply electrical power to aircraft must be dragged to and from the aircraft. These cables are long and heavy and friction intermediate an outer sheath of the cable and the tarmac makes this motion difficult to accomplish.

Therefore, an intermediate surface that is disposed between the cable and the surface upon which the cable is dragged that can reduce friction is desirable.

Two-piece prior art types of rings appear to be known for use with fluid transfer hoses (not cables) that are attached together by bolts. However, any ring that can separate, for example if the bolt loosens, can cause the ring to separate into two pieces and for the bolt and pieces to fall apart from the cable. It is not safe or permissible for debris to accumulate on the tarmac and in other areas as well.

Yet, there still is need of a way to attach a plurality of friction reducing electrical cable rings at spaced apart locations of an electrical cable. The rings ideally should not include separate component parts that can fall on the tarmac. There is also a preferred need to be able to attach these rings after an electrical cable has been assembled. It is not practical to do so before the cable is finished.

Furthermore, it is a requirement for the electrical cable to alternately be bent (i.e., curved to include a radius) and straightened during use. When any electrical cable is straight it maintains the same maximum outside diameter (OD) along its length. Any type of a ring that is placed around the electrical cable will, of necessity, extend for a portion along the longitudinal length of the cable. If the cable is straight, then the maximum OD that is experienced by the ring is the nominal OD of the cable.

However, when the electrical cable is bent the radius affects the effective OD of the cable. Because the inside of the ring experiences the OD of the cable along a portion of the cable's longitudinal length, whenever the cable is bent the OD experienced by the ring increases beyond the nominal OD of the cable itself. The inside of the ring experiences a substantial force urging it to expand as the electrical cable is bent.

Because a user is grasping the electrical cable and applying a force to bend it, as desired, a tremendous mechanical advantage occurs that magnifies the force applied to the cable proximate the ring. If the ring is in contact with the outside diameter of the electrical cable, the ring must accommodate this force that is urging it to expand. Accordingly, the ring can fracture or any method of securing it to the electrical cable will be compromised and fail prematurely as the electrical cable is periodically bent and straightened.

Also, several electrical cables are simultaneously required for certain applications. At present according to known prior art methods, a plurality of individually jacketed cables are disposed in a generally parallel longitudinal orientation with respect to each other and are secured in this general position by the use of either a plurality of steel bands, tape, or by a coating of shrink tubing of combination thereof. These methods of securing the individual cables together in a bundle add to the cost of manufacture and increases the weight of the total cable assembly, which makes movement of it all the more difficult.

Accordingly, there exists today a need for a friction reducing electrical cable ring for use with an electrical cable that helps ameliorate the above-mentioned difficulties.

Clearly, such an apparatus would be a useful and desirable device.

2. Description of Prior Art

Rings for hoses are, in general, known. Part No. DB4042/DBA11502 by Fluid Transfer with information available on the web at "fluid-transfer.co.uk" is sold specifically for fluid transfer applications and it secures two halves together around a hose by a brass set screw. While the structural arrangements of the above described device may, at first appearance, have similarities with the present invention, it differs in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a friction reducing electrical cable ring that reduces friction intermediate an electrical cable and a surface upon which the electrical cable is placed.

It is also an important object of the invention to provide a friction reducing electrical cable ring that is easy to manufacture.

Another object of the invention is to provide a friction reducing electrical cable ring that is inexpensive to manufacture.

Still another object of the invention is to provide a friction reducing electrical cable ring that is easy to apply over an electrical cable.

Still yet another object of the invention is to provide a friction reducing electrical cable ring that can be applied over an electrical cable at any preferred location along a longitudinal length of the electrical cable.

Yet another important object of the invention is to provide a friction reducing electrical cable ring that includes a continuous one-piece shell.

Still yet another important object of the invention is to provide a friction reducing electrical cable ring that is durable.

A first continuing object of the invention is to provide a friction reducing electrical cable ring that minimizes the potential for creating debris that can fall onto a surface upon which the cable ring is used.

A second continuing object of the invention is to provide a friction reducing electrical cable ring that secures the ring proximate a predetermined location along a longitudinal length of an electrical cable.

A third continuing object of the invention is to provide a friction reducing electrical cable ring that is adapted to apply a force to retain the ring proximate a predetermined location along a longitudinal length of an electrical cable.

A fourth continuing object of the invention is to provide a friction reducing electrical cable ring that is adapted to apply a force to retain the ring proximate a predetermined location along a longitudinal length of an electrical cable and to permit the ring to expand, as needed, when the electrical cable includes a radius along its longitudinal length.

A fifth continuing object of the invention is to provide a friction reducing electrical cable ring that is able to secure a plurality of cables extending in a longitudinal direction proximate each other.

A sixth continuing object of the invention is to provide a friction reducing electrical cable ring that can be used instead of steel bands, tape, or shrink tubing to secure a plurality of cables extending in a longitudinal direction proximate each other.

Briefly, a friction reducing electrical cable ring that is constructed in accordance with the principles of the present invention has a one-piece continuous shell with a gap at one end. The cable ring can be grasped and its two ends pulled apart to increase the size of the gap sufficient to fit over a longitudinal length of an electrical cable at any preferred location of the electrical cable. The cable ring includes a length of double sided self-adhesive tape extending along its inside length (ID) that is used to adhere the cable ring to an exterior surface of the electrical cable. A plurality of the cable rings are used. Modified versions of the cable ring are also disclosed.

DETAILED DESCRIPTION OF THE INVENTION

Figure 1:
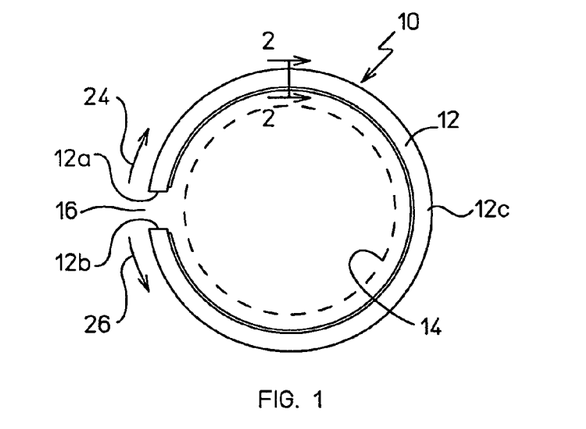
FIG. 1 is a side view of a preferred type of friction reducing electrical cable ring over an electrical cable.
Figure 2:
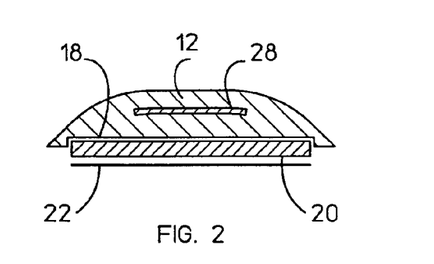
FIG. 2 is a cross-sectional view taken on the line 2-2 in FIG. 1, absent the electrical cable.
Figure 3:
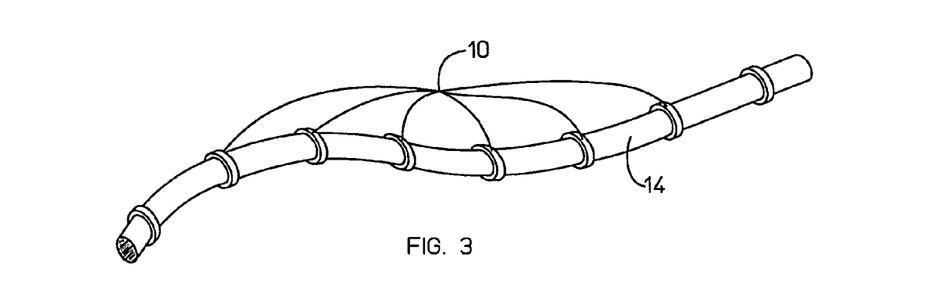
FIG. 3 is a view in perspective of a plurality of the cable rings of FIG. 1 disposed in a spaced-apart relationship over the electrical cable.

Referring to all of the drawings on occasion and now in particular to FIG. 1, FIG. 2, and FIG. 3 is shown, a friction reducing electrical cable ring, identified in general by the reference numeral 10.

A one-piece plastic body 12, or shell, is circular and naturally conforms to the shape of an electrical cable 14 (shown in dashed lines) that it is placed over.

As used herein, the term "electrical cable" 14 includes any type of flexible cable that has at least one electrical conductor therein.

The cable ring 10 includes an opening 16 (i.e., a gap) where a first end 12a and an opposite second end 12b are disposed in proximity to each other. When the cable ring 10 is properly attached to the electrical cable 14, the first end 12a and the second end 12b do not touch and still include a small space (a small amount of the opening 16) between them.

If there were no space present, then the inside diameter of the cable ring 10 could exceed the outside diameter of the electrical cable 14 and contact intermediate an inside surface of the cable ring 10 and an outside surface of the electrical cable 14 would be decreased and this condition is not desired.

Accordingly, the cable ring 10 is provided in a variety of sizes, each one adapted to fit over the outside diameter of the electrical cable 14 and to preserve the opening 16. When attached, the opening 16 is as small as is practical to attain, allowing for tolerances in the outside diameter of the electrical cable 14 that may occur.

Extending along the inside diameter surface (along an inside circumference) of the cable ring 10 is an optional longitudinal recess 18 that is adapted to receive a segment of double sided self-adhesive tape 20.

The double sided self-adhesive tape 20 includes an adhesive on opposite sides, one side adhering to the longitudinal recess 18 of the cable ring 10 and the other side to the electrical cable 14. The longitudinal recess 18 provides a groove for the double sided self-adhesive tape 20 that ensures it is disposed in a proper location and that it will secure the cable ring 10 to the electrical cable 14. To provide optimum adhesion of the cable ring 10 to the electrical cable 14, a depth of the longitudinal recess 18 is less than the thickness of the double sided self-adhesive tape 20.

A covering sheet 22 is disposed (if preferred) longitudinally over the inside adhesive surface of the double sided self-adhesive tape 20 and is removed immediately prior to adhesion of the cable ring 10 to the electrical cable 14.

A preferred shape in cross-section for the body 12 (or shell) as shown in FIG. 2 is arcuate with a small flat area that is in contact with a ground surface upon which it is disposed. This shape further reduces friction intermediate the cable ring 10 and the ground surface.

Typically, a plurality of the cable rings 10 are used in a spaced-apart relationship along a longitudinal length of the electrical cable 14 sufficient to elevate the electrical cable 14 above the surface it is placed upon.

The spacing will vary depending upon the parameters of the electrical cable 14 and the type of surface it is to be placed upon to provide an optimum reduction in friction.

After the electrical cable 14 is manufactured, including any end connectors (not shown) that may be desired, its exterior surface is cleaned with any preferred solvent or cleaner and the desired locations for each of the cable rings 10 is noted along the longitudinal length of the electrical cable 14.

The covering sheet 22 is peeled off of the cable ring 10 that is to be applied. The first end 12a and the second end 12b are urged apart, in the direction shown by arrows 24 and 26. The body 12 is flexible and allows for expansion of the opening 16 far in excess of its normal minimal amount.

Once the opening 16 size exceeds the outside diameter of the electrical cable 14, the cable ring 10 is urged over the electrical cable 14 and a rear 12c of the cable ring 10 is pressed against the electrical cable 14, to which it adheres.

The force is reduced at the opening 16 allowing it to decrease in size. The inside of the cable ring 10 progressively contacts and adheres to the exterior of the electrical cable 14, beginning with that portion of the double sided self-adhesive tape 20 that is disposed near the rear 12c and extending simultaneously toward both the first end 12a and the second end 12b. A squeeze from the outside ensures complete adhesion. This process is repeated for each of the cable rings 10.

There are no bolts or fasteners that can become dislodged.

If preferred, a wear band 28 is embedded or molded along the length of the body 12 of the cable ring 10 that includes a contrasting color. When the wear band 28 becomes visible, it means the cable ring 10 is worn and needs replacement. This also prevents damage from occurring to the electrical cable 14 because worn cable rings 10 are replaced before the surface can contact the exterior (sheath) of the electrical cable 14 and start to tear or erode it.

A surprising unexpected benefit provided is that the cable rings 10 not only end up reducing friction, but they also extend the life of the electrical cable.

Figure 4:
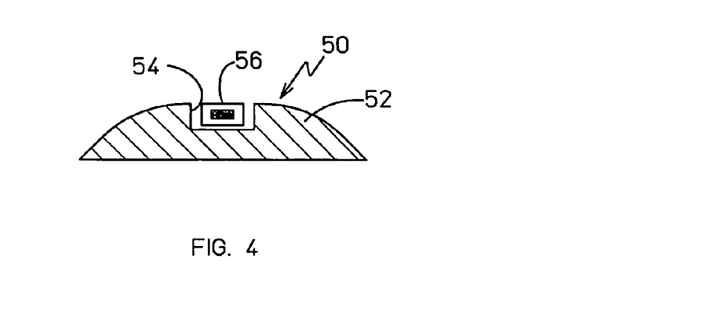
FIG. 4 is a cross-sectional view of a modified type of a friction reducing electrical cable ring.

Referring now to FIG. 4, a modified cable ring identified in general by the reference numeral 50 is shown in cross-section. The modified cable ring 50 is also preferably of one continuous piece for a modified body 52 and it also includes a similar type of the opening 16 (not shown).

The modified cable ring 50 includes a circumferential recess 54 that extends fully around its circumference (outside diameter). A cable tie 56, similar to the type well known in the electrical arts to bundle wires together is placed in the circumferential recess 54 and is tightened to secure the modified cable ring 50 along a longitudinal length of the electrical cable 14.

The modified cable ring 50 includes a pair of opposite ends, similar to the first end 12a and the second end 12b of the cable ring 10, which are grasped and similarly opened to allow placement of the modified cable ring 50 where desired over the electrical cable. The cable tie 56 is then placed in the circumferential recess 54 and is well tightened.

The cable tie 56 is disposed below an exterior surface of the modified cable ring 50 and therefore does not touch the ground surface. Accordingly, the cable tie 56 does not affect friction nor does it wear.

Even if the cable tie 56 were to break, another advantage of this design is that the modified cable ring 50 would still stay attached over the electrical cable 14. It might migrate along the longitudinal length of the cable but it would not become detached.

Furthermore, if desired, the longitudinal recess 18 and the double sided self-adhesive tape 20 of the cable ring 10 could also be incorporated into the design of the modified cable ring 50, thereby providing even better adherence of the modified cable ring 50 to the electrical cable 14 in harsher environments.

The wear band 28 is included, as desired (not shown in this view), in the modified cable ring 50.

The above-described devices allow placement of the cable rings 10 and the modified cable rings 50 anywhere along the longitudinal length of the electrical cable 14 after the cable 14 has been fully assembled.

Figures 5, 6:
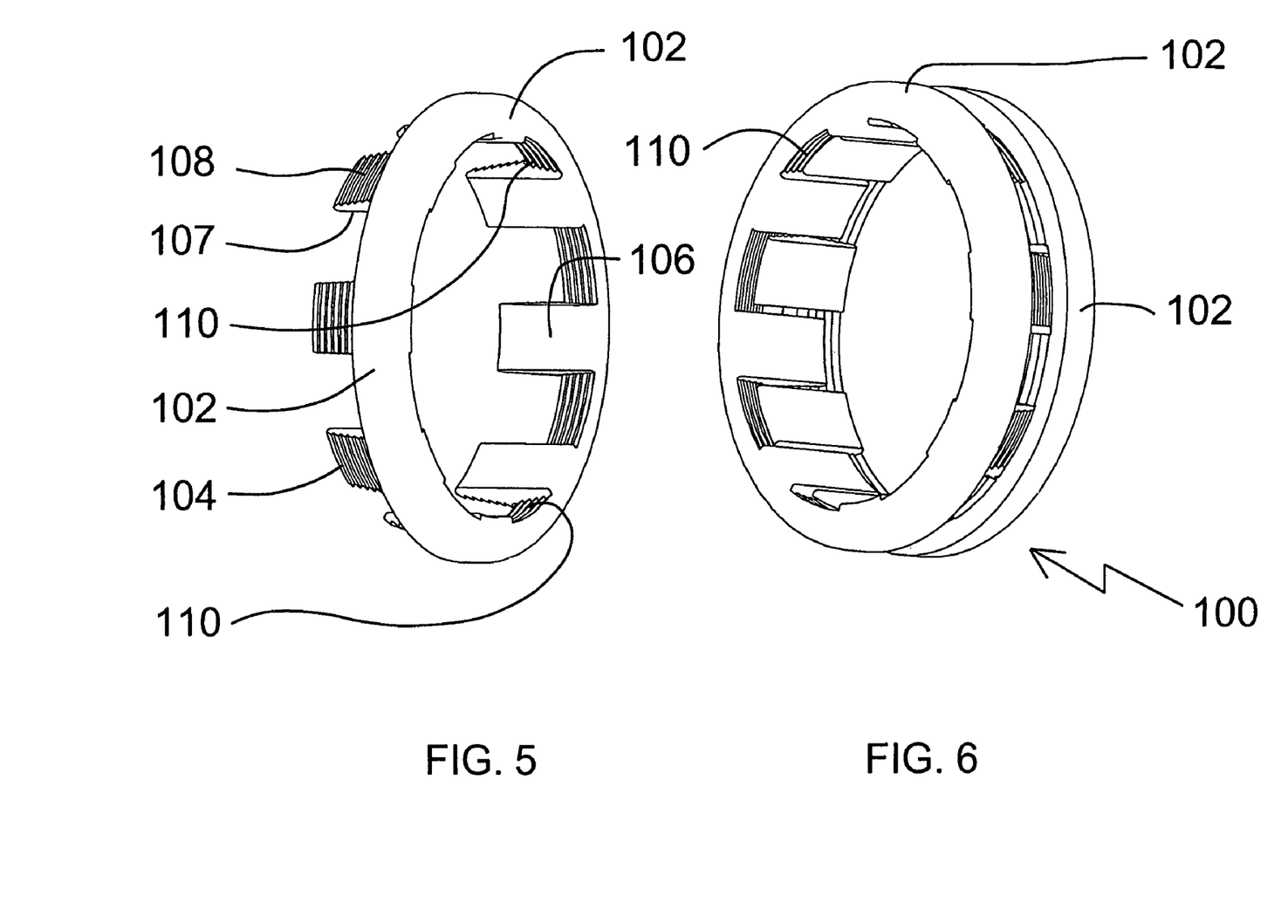
FIG. 5 is a view in perspective of a half of second modified type of a friction reducing electrical cable ring.
FIG. 6 is a view in perspective of a pair of the halves of the second modified type of a friction reducing electrical cable ring of FIG. 5 together.

Referring now to FIG. 5 and FIG. 6, a second modified cable ring identified in general by the reference numeral 100 is shown in perspective view.

The second modified cable ring 100 includes two identical halves 102 that must be slipped over an end of the electrical cable 14 and displaced longitudinally along that length to where desired. They are placed in pairs, with each of the identical halves 102 facing each other in order to complete the second modified cable ring 100.

Each identical half 102 of the second modified cable ring 100 includes a plurality of spaced apart extensions 104 that are attached thereto. A distance is provided between any two adjacent extensions 104 to allow the extensions 104 of one of the halves 102 to fit in between the extensions 104 of the remaining one of the halves 102.

It is important to note that the halves 102 are identical. This allows the same mold to generate either of the halves 102 which reduces manufacturing costs.

That portion of each of the extensions 104 that extends outward (along the longitudinal length of the cable 14) includes a flat inner surface 106 that is parallel with the exterior of the cable and in contact with it and a taper 107 on an opposite side that includes a plurality of parallel grooves and ridges 108.

The grooves and ridges 108 correspond with a second set of grooves and ridges 110 that are provided in each of the halves 102 intermediate the extensions 104.

When the two halves 102 that face each other are urged together (as shown in FIG. 6) the grooves and ridges 108 of each of the extensions 104 of each half engage with the second set of grooves and ridges 110 of the opposite one of the halves 102.

As force is applied to urge them closer together, the taper 107 forces the extension 104 to flex inward. This force translates into the extensions 104 applying a greater force to the outer surface of the electrical cable 14, which helps to better secure the second modified cable ring 100 in position along the longitudinal length of the electrical cable 14.

The grooves and ridges 108 of each of the extensions 104 engage with the second set of grooves and ridges 110 sufficient to prevent the two halves 102 from separating apart once they are sufficiently urged together.

Again, should the two halves 102 become separated for any reason, the two halves 102 cannot fall off of the electrical cable 14 and will still continue to reduce friction. Similarly, the wear band 28 can be included with each of the two halves 102, if desired.

Figure 7:
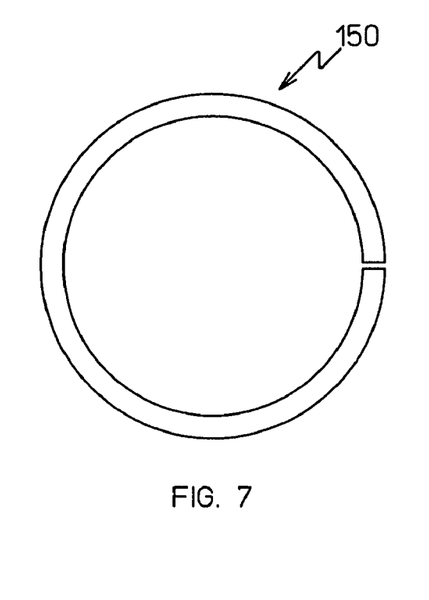
FIG. 7 is a side view of a third modified type of a friction reducing electrical cable ring after it is machined or molded.
Figure 8:
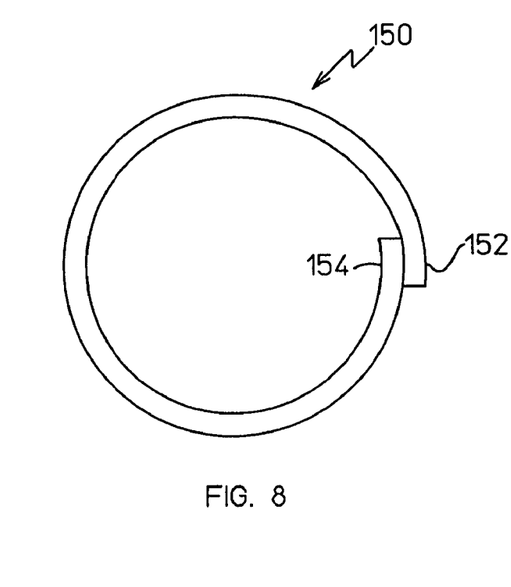
FIG. 8 is a side view of the third modified type of a friction reducing electrical cable ring of FIG. 7 after it has been heated and deformed.
Figure 9:
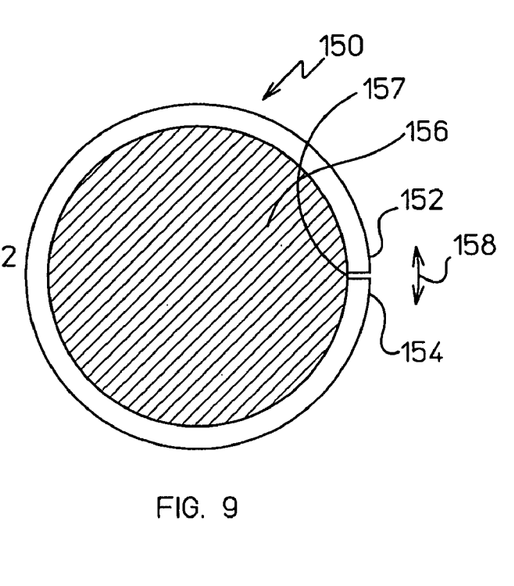
FIG. 9 is a cross-section view of an electrical cable and the third modified type of a friction reducing electrical cable ring of FIG. 7 disposed around the electrical cable.

Referring now to FIGS. 7, 8, and 9 is shown a third modified type of a friction reducing electrical cable ring, identified in general by the reference numeral 150.

FIG. 7 includes a side view of the third modified type of a friction reducing electrical cable ring 150 after it has been machined or molded.

FIG. 8 includes a side view of the third modified type of a friction reducing electrical cable ring 150 after it has been heated and deformed in an oven. The third modified type of a friction reducing electrical cable ring 150 is heated in an oven at about 240 degrees Fahrenheit.

While this elevated temperature can vary depending on the composition of the third modified type of a friction reducing electrical cable ring 150 and other factors, the temperature it is elevated to is below the melting point but above any expected ambient temperature that the third modified type of a friction reducing electrical cable ring 150 is expected to experience during use. Even an airport tarmac (not shown) in Arizona during the peak of summer is not expected to reach 240 degrees F.

The third modified type of a friction reducing electrical cable ring 150 is constrained in the oven to the configuration shown in FIG. 8 for a predetermined period of time, whereby a first end 152 is urged into position so that it includes an overlap over a second end 154 of the third modified type of a friction reducing electrical cable ring 150.

The predetermined period of time that the third modified type of a friction reducing electrical cable ring 150 is held in this position at elevated temperature is a variable depending on the material used to form the third modified type of a friction reducing electrical cable ring 150, the force used to constrain it, and other attributes of the third modified type of a friction reducing electrical cable ring 150. Typically, the third modified type of a friction reducing electrical cable ring 150 will be held in the position shown for several hours duration at the preferred elevated temperature (i.e., 240 degrees F.).

The sustained heat, while the third modified type of a friction reducing electrical cable ring 150 is forced to deform into the overlap, causes a reshaping of the plastic but without a melting of it. Accordingly, after the third modified type of a friction reducing electrical cable ring 150 is allowed to return back to ambient temperature, it generally retains the shape as shown in FIG. 8 with a portion of overlap remaining at the first end 152 and the second end 154 thereof, even after any constraining force that was used to urge it into the overlap position has been removed.

In this new position as shown in FIG. 8 after deformation and heating and subsequent cooling, the third modified type of a friction reducing electrical cable ring 150 has a new effective smaller inside diameter than it did initially after machining or molding, as shown in FIG. 7. Its new inside diameter, in a quiescent state, is less than the outside diameter of an electrical cable 156 (FIG. 9) about which it is to be disposed.

FIG. 9 includes a cross-sectional view of the electrical cable 156 and the third modified type of a friction reducing electrical cable ring 150 (the ring is not in cross-section disposed around the electrical cable 156. The cross-sectional view is of the cable 156 just prior to the third modified ring 150. The third modified type of a friction reducing electrical cable ring 150 is disposed around the electrical cable 156 and is shown in side-view (not in cross-section).

To install the third modified type of a friction reducing electrical cable ring 150 on the electrical cable 156, the first end 152 and the second end 154 are grasped and pulled apart (in the direction shown by arrow 158) a sufficient amount to allow the first end 152 and the second end 154 to pass over the electrical cable 156. When released, the first end and the second end 154 move toward each other in a direction opposite to that of arrow 158. The third modified type of a friction reducing electrical cable ring 150 then automatically clamps itself down over the electrical cable 156 to the position as shown in FIG. 9.

The smaller inside diameter of the re-shaped third modified type of a friction reducing electrical cable ring 150 provides a force that tends to urge it tightly against the electrical cable 156. This force is due to the new shape of the third modified type of a friction reducing electrical cable ring 150 that includes an inside diameter that is smaller than the outside diameter of the electrical cable 156.

This force tends to retain the third modified type of a friction reducing electrical cable ring 150 in whatever position along a longitudinal length of the cable 156 it is placed. If desired, other additional means to further increase adherence or friction between the third modified type of a friction reducing electrical cable ring 150 and the outside surface of the electrical cable 156 are also possible to include as part of the third modified type of a friction reducing electrical cable ring 150.

For example, the inside surface of the third modified type of a friction reducing electrical cable ring 150 can include a plurality of sharp protrusions, like teeth, to better grip a rubber jacket of the electrical cable 156.

In general, any version of the instant invention 10, 50, 100, 150 is intended to decrease friction of the electrical cable 156 with respect to the surface upon which it is placed by use of the rings 10, 50, 100, 150 as an intermediate surface. Similarly, it is desirable to increase friction or adherence between any of the rings 10, 50, 100, 150 and the electrical cable 156 sufficient to retain each of the rings 10, 50, 100, 150 where it has been placed along the longitudinal length of the electrical cable 156.

If the electrical cable 156 is bent (i.e., curved) this applies a force to the inside diameter of the third modified type of a friction reducing electrical cable ring 150 that tends to urge it apart. The effective outside diameter of the electrical cable 156 increases when it is bent, in proportion to the severity of radius that is introduced.

The third modified type of a friction reducing electrical cable ring 150 is able to accommodate the increase in effective outside diameter of the electrical cable 156 by expanding its size in response to changes in the electrical cable 156. The converse is also true.

Whenever the third modified type of a friction reducing electrical cable ring 150 is required to increase its size (i.e., its inside diameter) the magnitude of an opening 157 that is disposed between the first end 152 and the second end 154 increases, for example, when the electrical cable 156 is bent.

However, whenever the electrical cable 156 is straightened and its effective outside diameter decreases, the magnitude (size) of the opening 157 decreases in response as the first end 152 and the second end 154 of the third modified type of a friction reducing electrical cable ring 150 move toward each other.

The third modified type of a friction reducing electrical cable ring 150 always supplies a force that is attempting to squeeze the electrical cable 156, whether the cable 156 is curved or straight because it is always trying to seek a shape that includes a smaller inside diameter for the third modified type of a friction reducing electrical cable ring 150 than is the outside diameter of the electrical cable 156.

Accordingly, the third modified type of a friction reducing electrical cable ring 150 tends to stay in place along the longitudinal length of the electrical cable 156.

In this way, the third modified type of a friction reducing electrical cable ring 150 is able to accommodate repeated bending and straightening cycles of the electrical cable 156 without deterioration.

A plurality of the third modified type of a friction reducing electrical cable rings 150 are installed, as described above, in spaced-apart intervals along the longitudinal length of the electrical cable 156. The spaced apart intervals could be as short as a couple of inches or it may be several feet in magnitude between each of the third modified type of a friction reducing electrical cable ring 150s, depending on the size and type of the electrical cable 156, its intended use, and the characteristics of the surface upon which it is to be placed.

The third modified type of a friction reducing electrical cable ring 150 is preferably formed of a high strength, high temperature plastic, such as 30% glass filled nylon 6/6.

The third modified type of a friction reducing electrical cable ring 150 is sized so that the size of the opening 157 is very small, even negligible, once it is installed on the electrical cable 156. This is aesthetically pleasing and adds maximal wear resistance to the third modified type of a friction reducing electrical cable ring 150. It also helps to lower the coefficient of friction (i.e., drag) between the third modified type of a friction reducing electrical cable ring 150 and the surface upon which the electrical cable 156 is placed.

Other benefits are also provided. There is no mechanical joint, double-sided tape, or adhesive that can fail as a result of flexing by the electrical cable 156. This provides a substantial benefit in terms of ease of installation and maximum durability.

The third modified type of a friction reducing electrical cable ring 150 retains adequate retention force on the electrical cable 156 regardless of environmental factors, such as weather or heat, well-tolerating temperatures up to about 150 degrees F.

The benefits of those embodiments previously described, for example not having small parts that can break off and fall on the tarmac, are also provided by the third modified type of a friction reducing electrical cable ring 150.

While plastic is preferred for any version of the cable ring 10, 50, 100, any desired material may be used that provides sufficient friction-reducing characteristics.

All versions of the cable ring 10, 50, 100, 150 elevate the electrical cable 14 above the ground surface so that the electrical cable's 14 exterior is not in direct contact with the ground surface.

Figure 10:
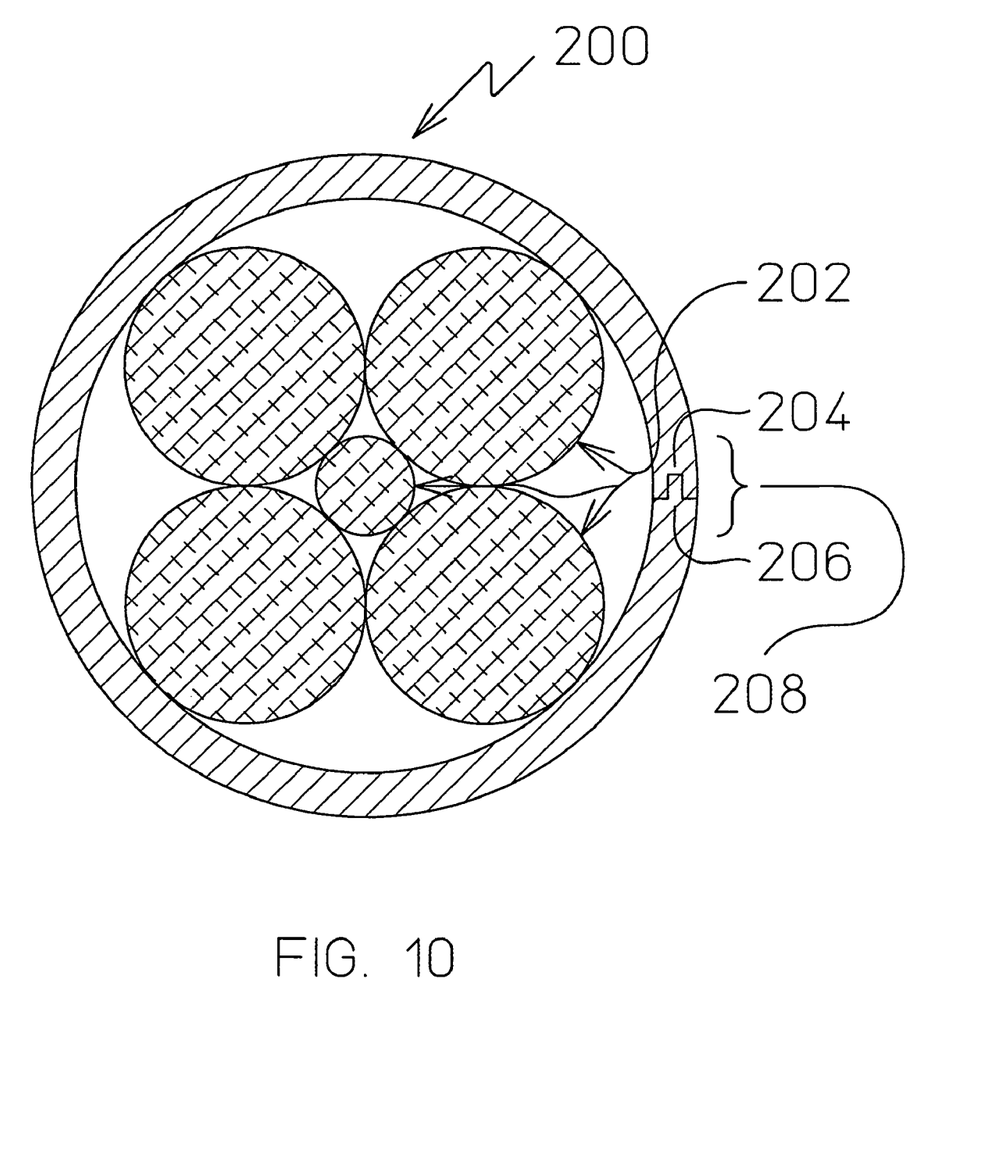
FIG. 10 is a cross-section view of a plurality of electrical cables and a fourth modified type of a friction reducing electrical cable that is disposed around the electrical cables.

Other methods can also be adapted for assembly of any version of the instant invention. For example, ultrasonic welding can be used to join (i.e., to fuse) the instant invention 10, 50, 100, 150 (or other further modifications thereof) together around the electrical cable. This is illustrated in FIG. 10 which includes a cross-section view of a fourth modified type of a friction reducing electrical cable ring, identified in general by the reference numeral 200 that is disposed around a plurality of electrical cables, the cables being identified in general by the reference numeral 202.

The fourth modified type of a friction reducing electrical cable ring 200 is preferably of one piece construction.

A groove 204 is provided on one end of the fourth modified type of a friction reducing electrical cable ring 200 and a protruding tongue 206 is provided on an opposite end thereof so that, when the two ends are urged together, the tongue 206 enters into the groove 204. FIG. 10 shows the tongue 206 disposed inside of the groove 204 with the two ends thereof fully urged together.

To apply the fourth modified type of a friction reducing electrical cable ring 200 over the plurality of electrical cables 202, the one end and the opposite end are grasped and urged apart sufficient to provide a distance there-between that permits passage over the plurality of electrical cables 202. The fourth modified type of a friction reducing electrical cable ring 200 opens to accommodate this expansion without incurring damage thereto. The one end and the opposite end are then urged together.

Means are provided, as is known in the sonic-welding arts, to support the fourth modified type of a friction reducing electrical cable ring 200 in the position shown during ultrasonic welding of the one end and the opposite end. The sonic welding, sometimes also referred to as ultrasound welding, occurs at an area identified by bracket 208.

After the sonic welding process has been completed, the tongue 206 and the groove 204 are at least partially fused together sufficient to retain the fourth modified type of a friction reducing electrical cable ring 200 around the plurality of plurality of electrical cables 202.

Because the fourth modified type of a friction reducing electrical cable ring 200 is securely fastened around the plurality of electrical cables 202 (i.e., it is tight when it is welded), it tends to stay in position along the longitudinal length of the plurality of electrical cables 202.

Accordingly, the unexpected benefit of also securing the plurality of electrical cables 202 together is also provided.

As many of the fourth modified type of a friction reducing electrical cable rings 200, as desired, are disposed in a spaced-apart orientation with respect to each other along the longitudinal length of the plurality of electrical cables 202 sufficient to provide the necessary friction reducing interface between an exterior of the plurality of electrical cables 202 and the surface upon which they are placed, and to also adequately secure the plurality of electrical cables 202 together.

The plurality of electrical cables 202 can include any quantity of individual electrical cables that comprise the plurality of electrical cables 202 and each may be any size, as preferred.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A friction reducing electrical cable ring, comprising:
   (a) a one-piece body that is able to be disposed around an electrical cable, said one-piece body includes a first end and an opposite second end, and wherein when said one-piece body is disposed around said electrical cable said one-piece body includes an outside diameter and an inside diameter and an inside circumference, and wherein a length of said one-piece body that extends from said first end to said second end along said inside circumference is less than an outer circumference of said electrical cable, said outer circumference of said electrical cable extending 360 degrees around an exterior of said electrical cable, and wherein said one-piece body includes a separation between said first end and said second end when said one-piece body is disposed around said electrical cable, and
   (b) means for securing said body to a longitudinal length of an electrical cable.

2. The friction reducing electrical cable ring of claim 1 wherein said body includes a flexible material that permits said opening size to be increased sufficient to extend over an outside diameter of said electrical cable.

3. The friction reducing electrical cable ring of claim 1 wherein said means for securing said body includes an adhesive disposed on an inside surface of said electrical cable ring.

4. The friction reducing electrical cable ring of claim 3 wherein said adhesive include a double sided self-adhesive tape, said double sided self-adhesive tape including an adhesive coating on opposite sides thereof.

5. The friction reducing electrical cable ring of claim 3 wherein said body includes a longitudinal recess that is disposed along a longitudinal length of an inner surface of said body, and wherein said longitudinal recess includes said adhesive.

6. The friction reducing electrical cable ring of claim 5 wherein said adhesive includes a double sided self-adhesive tape that is disposed in said longitudinal recess, said double sided self-adhesive tape including an adhesive coating on opposite sides thereof.

7. The friction reducing electrical cable ring of claim 6 wherein said double sided self-adhesive tape includes a covering sheet that is adapted to be peeled off of said adhesive sufficient to expose said adhesive.

8. The friction reducing electrical cable ring of claim 1 wherein said body includes a circumferential recess that extends around an outer circumference of said body, and including means for securing said friction reducing electrical cable ring to said electrical cable disposed in said circumferential recess.

9. The friction reducing electrical cable ring of claim 8 wherein said means for securing said friction reducing electrical cable ring includes a tie-wrap, said tie wrap disposed in said circumferential recess.

10. The friction reducing electrical cable ring of claim 1 wherein said continuous one piece body includes a first half and a second half and wherein said first half and said second half are each adapted to pass over a longitudinal length of said electrical cable when said first half is not attached to said second half, and including means for attaching said first half and said second half together.

11. The friction reducing electrical cable ring of claim 10 wherein said means for attaching said first half and said second half together includes at least one extension attached to said first half and at least one extension attached to said second half, and wherein each of said extensions of the first half is adapted to engage with a portion of the second half, and wherein each of said extension of the second half is adapted to engage with a portion of the first half.

12. The friction reducing electrical cable ring of claim 10 wherein said at least one extension includes an extension portion that extends beyond said body, said extension portion including a taper, said taper being disposed away from said electrical cable and including a plurality of spaced apart alternating grooves and ridges that are adapted to engage with a second set of grooves and ridges that are disposed on an opposite one of the halves.

13. The friction reducing electrical cable ring of claim 1 wherein said means for securing said body to said longitudinal length of said electrical cable includes an inside diameter for said continuous one piece body that is less than an outside diameter of an electrical cable about which it is disposed.

14. The friction reducing electrical cable ring of claim 1 wherein said body includes a first end and an opposite second end and wherein when said ring is disposed around said electrical cable, said first end and said second end includes a welded portion that retains said first end proximate said second end.

15. The friction reducing electrical cable ring of claim 14 wherein said welded portion includes an ultrasound-welded portion.

16. The friction reducing electrical cable ring of claim 1 wherein said body includes a wear band, said wear band embedded in said body below a surface thereof and including a contrasting appearance with respect to said body.

17. An improvement to an electrical cable to reduce the friction between the electrical cable and a ground surface that the electrical cable is placed, wherein the improvement comprises:
   means for elevating said electrical cable above said ground surface disposed along a longitudinal length of said cable, said means including a one-piece body that is able to be disposed around an electrical cable, said one-piece body includes a first end and an opposite second end, and wherein when said one-piece body is disposed around said electrical cable said one-piece body includes an outside diameter and an inside diameter and an inside circumference, and wherein a length of said one-piece body that extends from said first end to said second end along said inside circumference is less than an outer circumference of said electrical cable, said outer circumference extending 360 degrees around an exterior of said electrical cable, and wherein said one-piece body includes a separation between said first end and said second end when said one-piece body is disposed around said electrical cable.

18. An improvement to an electrical cable to reduce the friction between the electrical cable and a ground surface that the electrical cable is placed, wherein the improvement comprises:
   a plurality of spaced-apart rings disposed around said electrical cable, each of said rings secured to said electrical cable at a predetermined location along a longitudinal length of said electrical cable, and wherein each of said rings includes a one-piece body that is able to be disposed around an electrical cable, said one-piece body includes a first end and an opposite second end, and wherein when said one-piece body is disposed around said electrical cable said one-piece body includes an outside diameter and an inside diameter and an inside circumference, and wherein a length of said one-piece body that extends from said first end to said second end along said inside circumference is less than an outer circumference of said electrical cable, said outer circumference extending 360 degrees around an exterior of said electrical cable, and wherein said one-piece body includes a separation between said first end and said second end when said one-piece body is disposed around said electrical cable.

19. A method for making a friction-reducing ring for placement around an electrical cable, comprised of the steps of:
   a. providing said ring with a length along an inner circumference thereof and a first end and an opposite second end and including a separation between said first end and said second end so that said ring does not form a continuous circle, and wherein said ring includes a first inside diameter; and
   b. treating said ring sufficient to provide a treated ring by urging said first end tangentially and toward a center of said ring into a first new position and by urging said second end tangentially and toward said center of said ring into a second new position, said treated ring having a second inside diameter for said treated ring, said second inside diameter being less than said first inside diameter.

20. The method of claim 19 wherein the step of treating said ring includes the additional steps of:
   a. disposing said ring in an environment that includes an elevated temperature that greater than a maximum ambient temperature that said ring is expected to experience during use and which is below a melting point of said ring; and
   b. maintaining said first end in said first new position and said second end in said second new position for at least a portion of the time that said ring is disposed in said environment at said elevated temperature.

21. The method of claim 20 including the additional steps of:
   a. providing an overlap of said first end of said ring over said second end of said ring when said first end is disposed in said first new position and when said second end is disposed in said second new position for at least a portion of the time that said ring is disposed in said environment at said elevated temperature; and
   b. cooling said ring while maintaining said overlap.

22. A method of securing a friction-reducing ring around an electrical cable, comprised of the steps of:
   a. providing said ring with a a one-piece body that is able to be disposed around an electrical cable, said one-piece body includes a first end and an opposite second end, and wherein when said one-piece body is disposed around said electrical cable said one-piece body includes an outside diameter and an inside diameter and an inside circumference, and wherein a length of said one-piece body that extends from said first end to said second end along said inside circumference is less than an outer circumference of said electrical cable, said outer circumference extending 360 degrees around an exterior of said electrical cable, and wherein said one-piece body includes a separation between said first end and said second end when said one-piece body is disposed around said electrical cable; and b. placing said ring around said electrical cable.

23. The friction reducing electrical cable ring of claim 1 wherein said at least one electrical cable includes a plurality of electrical cables that are disposed in a substantially parallel orientation with respect to each other wherein a center longitudinal axis of each of said plurality of electrical cables is substantially parallel with respect to a remainder of said plurality of electrical cables.

* * * * *